(12) United States Patent
Johnson

(10) Patent No.: US 12,278,494 B2
(45) Date of Patent: Apr. 15, 2025

(54) METHOD FOR BLACK-STARTING AN ELECTRICAL GRID

(71) Applicant: Ørsted Wind Power A/S, Fredericia (DK)

(72) Inventor: Howard Philip Johnson, London (GB)

(73) Assignee: Ørsted Wind Power A/S (DK)

(*) Notice: Subject to any disclaimer, the term of this patent is extended or adjusted under 35 U.S.C. 154(b) by 620 days.

(21) Appl. No.: 17/602,699

(22) PCT Filed: Mar. 5, 2020

(86) PCT No.: PCT/EP2020/055934
§ 371 (c)(1),
(2) Date: Oct. 8, 2021

(87) PCT Pub. No.: WO2020/207675
PCT Pub. Date: Oct. 15, 2020

(65) Prior Publication Data
US 2022/0209540 A1    Jun. 30, 2022

(30) Foreign Application Priority Data

Apr. 11, 2019 (EP) .................................... 19168655

(51) Int. Cl.
| | |
|---|---|
| G05B 19/042 | (2006.01) |
| H02J 3/28 | (2006.01) |
| H02J 3/38 | (2006.01) |

(52) U.S. Cl.
CPC ............ *H02J 3/381* (2013.01); *G05B 19/042* (2013.01); *H02J 3/28* (2013.01); *H02J 3/388* (2020.01);
(Continued)

(58) Field of Classification Search
CPC .......... H02J 3/381; H02J 2300/28; H02J 3/38; H02J 3/40; H02J 3/42; H02J 3/388
See application file for complete search history.

(56) References Cited

U.S. PATENT DOCUMENTS

| | | |
|---|---|---|
| 8,000,840 B2 | 8/2011 | Nielsen |
| 9,831,678 B2 | 11/2017 | Premm et al. |

(Continued)

FOREIGN PATENT DOCUMENTS

| | | |
|---|---|---|
| CN | 104836248 A | 8/2015 |
| CN | 104885323 B | 9/2015 |

(Continued)

*Primary Examiner* — Darrin D Dunn
(74) *Attorney, Agent, or Firm* — Condo Roccia Koptiw LLP

(57) ABSTRACT

Described are systems and methods for black-starting an electrical grid, comprising disconnecting an energy farm from the grid at a first location, said first location being located between the electrical grid and the energy storage with the associated converter, providing a synchronous condenser, energizing the AC export cable using said energy storage and the associated converter, energizing at least one part of the energy farm electrical infrastructure via said AC export cable using said energy storage and the associated converter, re-establishing energy supply to said energy farm electrical infrastructure by said electric generators, energizing said synchronous condenser, and reconnecting the energy farm to said electrical grid at said first location.

17 Claims, 1 Drawing Sheet

(52) U.S. Cl.
CPC ... *G05B 2219/2639* (2013.01); *H02J 2300/28* (2020.01)

(56) References Cited

U.S. PATENT DOCUMENTS

| | | |
|---|---|---|
| 2005/0042098 A1 | 2/2005 | Wobben |
| 2008/0284172 A1* | 11/2008 | Nielsen ............... F03D 7/048 290/44 |
| 2009/0096212 A1* | 4/2009 | Turner ................ H02J 3/1885 290/44 |
| 2009/0309421 A1* | 12/2009 | Angquist .......... H02J 13/00017 307/46 |
| 2012/0261917 A1 | 10/2012 | Egedal et al. |
| 2013/0215652 A1 | 8/2013 | Komatsu et al. |
| 2013/0221877 A1* | 8/2013 | Marken ................. H02P 1/46 320/137 |
| 2014/0268926 A1* | 9/2014 | Gupta .................... H02M 5/44 363/35 |
| 2015/0303689 A1* | 10/2015 | Collantes ............. G05B 15/02 700/295 |
| 2016/0094032 A1* | 3/2016 | Vaudreuil ............. H02J 3/144 700/295 |
| 2017/0009744 A1* | 1/2017 | Brogan ................... H02J 3/36 |
| 2017/0074244 A1 | 3/2017 | Huang et al. |
| 2017/0214250 A1 | 7/2017 | Zietlow et al. |
| 2018/0175622 A1* | 6/2018 | Brorsson .................. H02J 3/36 |
| 2018/0248379 A1* | 8/2018 | Schulz .................... H02J 11/00 |
| 2018/0366978 A1* | 12/2018 | Matan ................... G06Q 50/06 |
| 2019/0081506 A1* | 3/2019 | Chang ...................... H02J 3/38 |
| 2020/0400120 A1* | 12/2020 | Brogan ................... H02J 11/00 |
| 2021/0047997 A1* | 2/2021 | Abeyasekera .......... H02J 3/381 |
| 2021/0234398 A1* | 7/2021 | Morton .................. H02J 9/068 |
| 2023/0318298 A1* | 10/2023 | Zhang .................... H02J 3/381 323/201 |

FOREIGN PATENT DOCUMENTS

| | | |
|---|---|---|
| CN | 104953616 B | 9/2015 |
| CN | 105262136 B | 1/2016 |
| CN | 106712092 B | 5/2017 |
| EP | 1909371 A2 | 9/2008 |
| EP | 2216546 A1 | 8/2010 |
| EP | 3051124 A1 | 8/2016 |
| JP | 2001-268797 A | 9/2001 |
| JP | 2005-505223 A | 2/2005 |
| JP | 4920315 B2 | 4/2012 |
| JP | 2017-085811 A | 5/2017 |
| JP | 2017-200327 A | 11/2017 |
| SE | 1851265 A1 | 11/2018 |
| TW | 201136090 A | 10/2011 |
| WO | WO 2011/058170 A1 | 5/2011 |
| WO | 2012/039034 A1 | 3/2012 |
| WO | WO 2015/078471 A1 | 6/2015 |
| WO | WO 2017/004125 A1 | 1/2017 |

\* cited by examiner

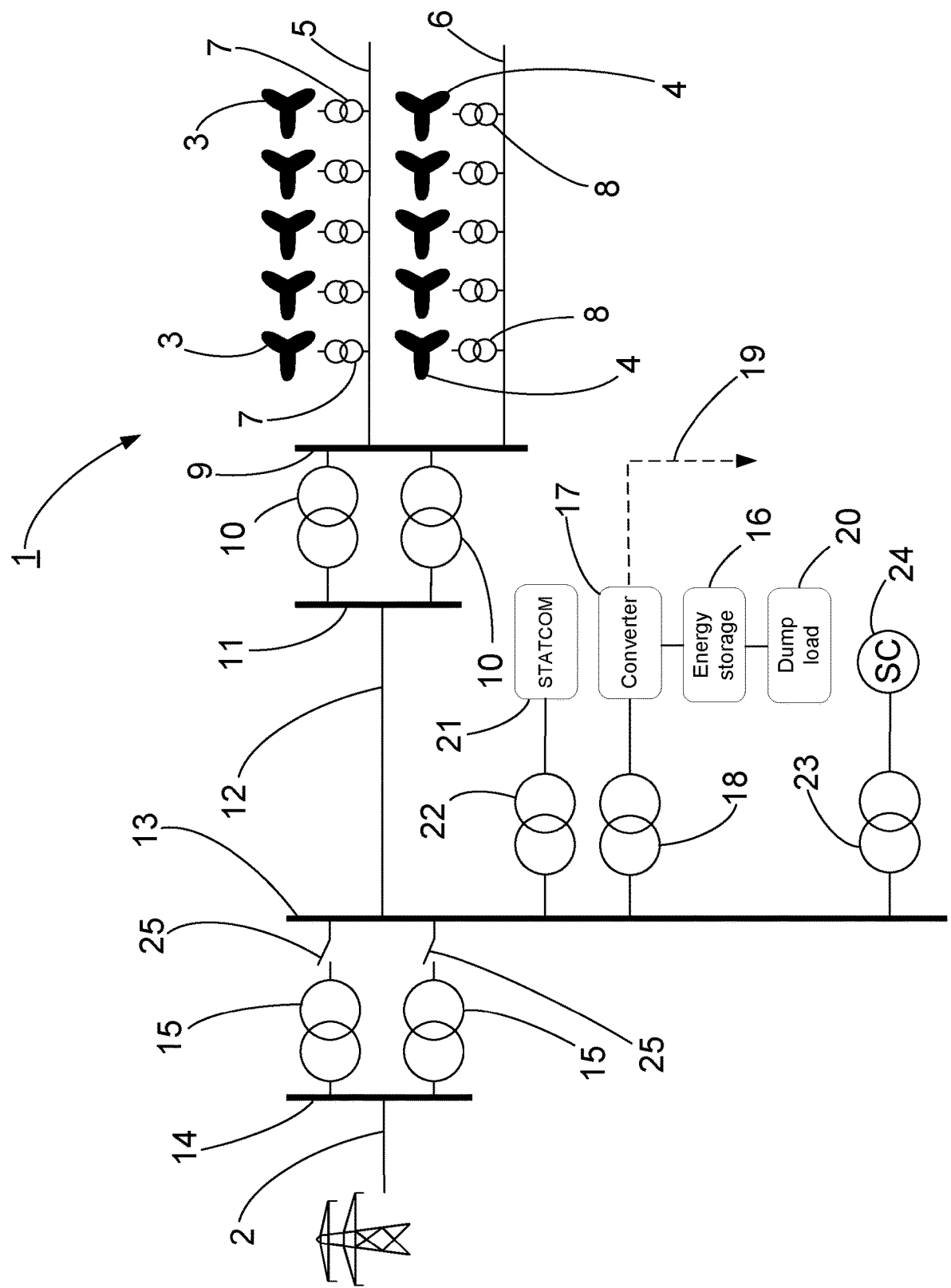

METHOD FOR BLACK-STARTING AN ELECTRICAL GRID

CROSS REFERENCE TO RELATED APPLICATIONS

This application is the National Stage Entry under 35 U.S.C. § 371 of Patent Cooperation Treaty Application No. PCT/EP2020/055934, filed 5 Mar. 2020, which claims priority from European Application No. 19168655.9, filed 11 Apr. 2019, the entire contents of each of which are hereby incorporated by reference herein.

TECHNICAL FIELD

The present invention relates to a method of black-starting an electrical grid, in particular, but not exclusively a method and use of a wind farm for black-starting an electrical grid.

BACKGROUND

In the field of electricity generation and transmission, black-start is a service provided to the operator of an electrical grid, such as a transmission system operator, TSO, or a distribution system operator, DSO, when an electrical grid, i.e. a power transmission or distribution system needs to be reenergized after a blackout, i.e. a total loss of power in the grid. The capability of reenergizing the grid system without the support of the grid itself, is known as black-start service. This is a service the grid operator pays selected electricity generators for maintaining and providing.

In the event of a blackout of the grid the grid connections to the consumers as well as to electricity generators such as power plants are opened and the grid is separated into smaller sub-systems which are no longer energized. The restart process of the system then takes place by a step-by-step process where power plants are powered up in island mode, i.e. without connection to the grid and then used to connect to and re-energize separate parts of the grid. Subsequently the separate parts of the grid are synchronized and interconnected again. Transmission system operators and distribution system operators have detailed procedures for re-establishing grid operation, but depending on how widespread the blackout is the re-establishment process can take several hours. Power plants able to connect to a dead, i.e. de-energized, grid and re-energize it are called black-start power plants, and, as mentioned, transmission system operators and distribution system operators contract power plant owners to provide black-start services. Since, in case of a blackout, large numbers of consumers, including critical infrastructure are without power it is of outmost importance to get the grid and the supply thereto re-established as quickly as possible. Keeping the start-up time for the black-start power plant as low as possible is therefore important. Not all power plants however have the capability of black-starting, e.g. wind turbines, wind farms, and photo-voltaic plants would normally not. For instance, asynchronous generators as often used in wind turbines are highly dependent on a stable external AC supply for their magnetizing and will lose synchronicity and experience runaway if not stopped when the connection to the external power system is lost, i.e. to the grid. Even double-fed asynchronous generators will only be able to ride-through a loss of the grid for short periods in the range of 0.1 to 3 seconds before experiencing runaway if not stopped, upon which a cumbersome restart procedure needs to be performed after the grid is re-energized. Other systems like wind turbines with permanent magnet generators, rely on AC/DC and DC/AC conversion, where the latter also needs power from the external power system to be able to power up AC/DC and DC/AC converters before start producing power with the wind turbine. Likewise do the DC/AC converters of photo-voltaic plants. Evidently such generators are not well suited for black-start without additional capabilities being incorporated into the design.

Fault ride-through, low voltage ride-through, and high voltage ride through, are phrases commonly used to describe short duration abnormal voltage events in power systems, where ride-through means that systems and components, such as wind turbines and wind farms, remain connected.

Traditionally, black-start services have therefore been provided by central thermal power plants with synchronous generators, but with the phasing out of thermal power plants transmission system operators and distribution system operators are facing an increasing need for new providers of black-start services. It is therefore of interest if renewable energy sources such as wind turbines, in particular in wind farms, generating electricity may be used for black-start of the electricity grid, i.e. the aforementioned transmission and distribution systems. Furthermore, there is a tendency towards larger wind farms being offshore, and it would be of particular interest to use these for black-start services.

In this respect, various methods of using wind turbines and wind farms for black-start have already been suggested. Examples inter alia are found in the disclosures of U.S. Pat. No. 8,000,840, EP1909371, CN104836248 and US2012/0261917. Common to the methods of these disclosures is that they approach the black-start problem in much the same way as traditional black-start from central thermal power plants with synchronous generators. That is to say start a small generator, such as a diesel engine driven generator or a gas fired turbine driving a generator. The small diesel generator in turn providing power to start a larger generator, e.g. a gas fired turbine driven generator, and possibly a larger steam driven turbo-generator in island mode, and then eventually when a stable island mode is reached reconnect to the grid to power it up and, i.e. black-starting it, and then in turn, allow other generating plants which need the grid to start and reconnect. Likewise, in the above-mentioned disclosures, a source close to a single wind turbine generator is used to start up that one wind turbine, and only when that single wind turbine generator is stable can other wind turbine generators connected to the same array cable line or bus bar be started. It therefore takes quite a while before the entire wind farm is up and running sufficiently stable in island mode, so that it can be used for black-starting the electricity grid.

Faced with this problem, it has been realized that it is indeed possible to reduce the time required for black-start of a wind farm and the complexity of the black-start operation by the use of battery storage located at the shore end of the cables connecting the windfarm, to initially charge up the cables to the windfarm and the array cables to the individual wind turbines, and provide a reference frequency to enable the wind turbines to reconnect and operate in power island mode.

However, even though island mode can be reached sufficiently fast for a wind farm to be considered as capable of black start, there may be circumstances where the reconnection of the grid becomes a problem, e.g. because of the high initial power demand of the powerless electrical grid. Unlike a conventional black-start generator comprising either a gas fired turbine driven synchronous generator, or a steam turbine driven synchronous generator that does provide inertia, a wind farm does not provide system inertia because the wind turbine driven generators are not synchronized to the system. That is to say, the rotational energy stored in the asynchronous generators and rotors of the wind turbine generators is not directly available, because the asynchronous generators are not connected directly to the grid, but rather through rectifiers and inverters. Neither will these rectifiers and inverters normally be able to provide—even for a few seconds, the sustained output power several times the nominal load as required when connecting to a dead, i.e. powerless grid or even a section thereof, with a persisting fault from before the electrical grid went dead nor will they be able to respond fast enough. In that case the relay protection systems may not work reliably to clear the fault in the electrical grid, i.e. the fault current never rises sufficiently to allow protective equipment to trigger and clear faults. The same applies to other generators or systems where the output AC is provided by inverters, such as photovoltaic solar farms.

SUMMARY

According to a first aspect of the present invention these objects are achieved by a method for black-starting an electrical grid, said method comprising providing an electrical grid, providing an energy farm having an electrical infrastructure and a first number of electric generators, providing an AC connection cable for connecting said energy farm to said electrical grid, providing an energy storage with an associated converter, providing a synchronous condenser, disconnecting the energy farm from the grid at a first location, said first location being located between the electrical grid and the energy storage with the associated converter, energizing the AC export cable using said energy storage and the associated converter, energizing at least one part of the energy farm electrical infrastructure via said AC export cable using said energy storage and the associated converter, re-establishing energy supply to said energy farm electrical infrastructure by said electric generators, energizing said synchronous condenser, and reconnecting the energy farm to said electrical grid at said first location.

Provided that the energy source is sufficiently large to provide the necessary energy to do so, energizing the energy farm electrical infrastructure in island mode via the AC export cable allows a much faster black-start as compared to the above traditional approaches, because large numbers of electric generators may be supplied at the same time and thus be released for starting in groups or simultaneously. Furthermore, when reconnecting the energy farm infrastructure thus energized, but still in island mode, to the dead electrical grid, the synchronous condenser will be able to provide the high momentary power demands of the powerless grid.

Thus, according to a preferred embodiment of the first aspect of the present invention, the wind farm is offshore and the energy storage with the associated converter and the synchronous condenser are on-shore.

According to a further preferred embodiment of the first aspect of the invention, the energy farm electrical infrastructure comprises two or more groups of electric generators connectable to a corresponding number of array cable lines connectable to a bus bar system wherein the at least one part of the energy farm electrical infrastructure energized via said AC export cable using said energy storage and the associated converter comprises one of said number of array cable lines.

If only a single array cable line is to be energized and not the entire energy farm, then this requires less energy storage and may still be sufficient to establish a stable island mode capable of restarting the electrical grid and/or the remainder of the energy farm. In either case this will be faster than the above disclosed traditional approach.

According to another preferred embodiment of the second aspect of the invention, the converter comprises a STATCOM. The STATCOM may be an integrated part of the converter to provide the converter STATCOM capabilities or separate therefrom. The STATCOM can be used for maintaining voltage stability and reactive power balance when energizing the AC line and the high voltage components associated with it as well as for maintaining voltage stability and reactive power balance when reconnecting the islanded black-start energy farm to the electrical grid.

According to a further preferred embodiment of the first aspect of the invention, the energy storage with the associated converter provides power to the electrical grid after reconnecting the energy farm to said electrical grid at said first location. In this way any remaining capacity of the energy storage can be used to support the re-energizing of the electrical grid and the stability thereof during this.

According to a further preferred embodiment according to the first aspect of the invention, the method further comprises providing one or more dump loads and control systems for controlling the dump loads, and using the control systems to control energy dissipation in the dump loads to help balancing the disconnected energy farm, i.e. help keeping the islanded system stable. Using controlled dump loads connected to the disconnected, i.e. islanded, energy farm may contribute to balancing the islanded energy farm, in particular once the electric generators are reconnected to the islanded energy farm.

According to yet a further preferred embodiment of the present invention, synchronisation information is sent to further converters. This allows other similar energy farms to black-start in synchronicity, in turn, allowing the entire electrical grid to be re-unified faster as segmented parts re-energized by different black-start energy farms will need less or no time to synchronise before they are reconnected with each other.

According to a second aspect of the invention the object is achieved by the use of a synchronous condenser and an energy storage with an associated converter for a black-start method according to the above method.

According to a third aspect of the invention the object is achieved by the use of a method for re-energizing an electrical grid, said method comprising providing an energy farm having an electrical infrastructure and a first number of electric generators, providing an AC export cable for connecting said energy farm to said electrical grid, providing an energy storage with an associated converter, disconnecting the energy farm from the grid at a first location, said first location being located between the electrical grid and the energy storage with the associated converter, maintaining energizing of the AC export cable using said energy storage and the associated converter, and energizing at least one part of the energy farm electrical infrastructure via said export cable using said energy storage and the associated converter, reconnecting the energy farm to said electrical grid at said first location.

Hereby the energy storage is used as an uninterruptable power storage to support the disconnected energy farm in island mode. This is particularly useful, when the electric generators are wind turbine generators, as it may allow the wind turbines to ride-through until island mode is established and the wind farm enters a stable island mode in which the wind farm can remain for an extended period, during which a synchronous condenser can furthermore contribute to maintaining island mode stability, until either the grid is re-energized and the wind farm can reconnect in a controlled manner, or from which island mode the wind farm can be used for reenergizing the grid as described herein.

Thus, according to a preferred embodiment of the third aspect of the invention, when the least one part of the energy farm electrical infrastructure is maintained energized via said AC export cable said at one part of the energy farm is maintained in island mode for a period of time before reconnecting the energy farm to said electrical grid at said first location.

According to a fourth aspect of the invention the object is achieved by providing an energy farm adapted to carry out the method recited above.

According to a fifth aspect of the invention the object is achieved by an energy farm adapted for executing the method according to the first aspect of the invention, wherein said energy farm comprises

- an electrical infrastructure and a first number of wind turbine generators which are operationally dependent on an external AC supply,
- an AC export cable for connecting said energy farm to said electrical grid,
- an energy storage with an associated converter,
- a synchronous condenser,
- switchgear for disconnecting the energy farm from the grid at a first location, said first location being located between the electrical grid and the energy storage with the associated converter.

BRIEF DESCRIPTION OF THE DRAWING

The invention will now be described in greater detail based on nonlimiting exemplary embodiments and with reference to the drawing on which:

FIG. 1 schematically and simplified shows a system incorporating electrical grid with an energy farm exemplified as a wind farm capable of performing the method according to the invention.

DETAILED DESCRIPTION

For the sake of explanation it will in the following description be assumed that the energy farm is an offshore wind farm using conventional wind turbine generators, i.e. asynchronous generators which are operationally dependent on an external AC supply. Much of the layout or topology of the system of FIG. 1 is quite conventional and will only briefly be described, as the essence of the present invention resides in the completely new approach to black-start and island mode operation of the energy farm. The topology may be much more complex than shown in FIG. 1, but has been simplified for explanatory reasons. A similar topology is disclosed in the prior art document EP2573896.

The energy farm, exemplified as a wind farm 1, which under normal circumstances is connected to the electrical grid 2 comprises a number of electric generators, in casu wind turbines 3 and 4. If the energy farm was a photovoltaic solar farm, the electric generators would instead be arrays of photovoltaic cells which are also operationally dependent on an external AC supply.

The term electrical grid 2 in the present application is to be understood as comprising both power distribution systems and power transmission systems. Power transmission systems are often defined as systems operated at voltages higher than 100 kV, while systems operated at lower voltages such as 66 kV, which are often named "power distribution systems". Companies operating these systems are often referred to as Transmission System Operators and Distribution System Operators, respectively. Accordingly, the wind farm 1 connects either to a transmission system or to a distribution system. Hence black-start services can either be provided directly to the transmission system or to/via a distribution system.

Groups of wind turbine generators 3, 4 are connected to a common array cable line 5, 6, respectively, via a number of transformers 7, 8 transforming the normally low voltage generator output to a medium voltage (MV) used on the offshore MV bus bar 9. Typically, the low voltage (LV) is 400-990 V and the medium voltage is typically about 33-35 kV or about 66 kV. It should be noted that some wind turbine generators operate at medium voltage and in that case the transformers 7, 8 may not be needed. Currently, however, typical wind turbine generators are asynchronous generators or permanent magnet synchronous generators, the output coupled via an AC/DC/AC converter. A suitable number of transformers 10 are connected between the offshore MV bus bar system 9 and an offshore high voltage bus bar system 11 to which an AC connection cable, exemplified by the AC export cable 12, is connected. Typically, the high voltage (HV) used for the AC export cable is 220 kV. On-shore the AC export cable 12 is connected to an on-shore HV bus bar system 13. The onshore HV bus bar system 13 is in turn connected to the transmission side HV bus bar system 14 via grid transformers 15 delivering the HV system voltage of the electrical grid, typically 400 kV. As can be seen the system further comprises an energy storage 16 such as a battery connected via a converter 17 and a transformer 18 to the on-shore HV bus bar 13. Furthermore, a STATCOM 21 may be connected to the on-shore HV bus bar 13, e.g. via a separate transformer 22, as illustrated in FIG. 1. A dump load 20 may also be provided.

As to the STATCOM it should be noted, that a large variety of power electronic devices and sub-systems are used in power systems for providing various functions such as voltage control, reactive power control and frequency control. Such devices and sub-systems are often referred to as STATCOM's (Static Synchronous Compensator), SVC's (Static Var Compensator), FACTS (Flexible AC Transmission Systems) etc. In order to simplify the description STATCOM is used throughout this description while it shall be understood that the description also applies for any other such device or sub-system.

It should be noted that the design described in FIG. 1 is one embodiment, and the skilled person will understand that there are multiple other possible designs. In particular it should be clear that the transformer 18 may be combined with the grid transformer 15 connecting the converter 17 to a tertiary winding on the grid transformer 15. This is a method of connecting STATCOMs 21 often seen. Likewise, it should be clear that the transformer 18 could be connected at other locations such as to the HV bus bar system 14, but in principle also at the offshore bus bar system 11 or the offshore MV bus bar 9, although that may be less interesting due to the costs associated with placing large components offshore.

According to an additional aspect of the present invention is suggested to implement suitable control of the converter 17 to substitute the electrical grid 2 in the event of a loss thereof. That is to say, in the event of a loss of the grid 2 the connection thereto is immediately interrupted, e.g. between the grid transformers 15 and the on-shore HV bus bar system 13 using suitable switchgear 25, typically at an onshore location. The island mode thus established may then be kept stable by the energy storage 16 and converter 17 for a substantially longer time than the ride-through capacity of the individual wind turbine generators 3, 4 thereby making it possible for the wind farm 1 to go directly into island mode ready to provide black-start service to the grid 2 or ready to synchronize with and reconnect to the grid when the grid has been reenergized. One or more dump loads 20 may be used at different locations in the islanded system to help stabilize it, i.e. keeping frequency and voltage stable. One such location would be in the on-shore substation in connection with or associated with the energy storage 16 and converter 17. Please note that FIG. 1 is purely schematic in this respect, and the blocks representing the energy storage 16, the converter 17, dump load 20, and STATCOM 21 could and would in practice be coupled differently as already indicated above. Typically, a dump load 20 comprises an air-cooled resistor bank where the dissipated power is controlled e.g. by electronically chopping the electrical supply.

If, however, the ride through fails, the wind farm 1 will still be able to implement the method according to the first and second aspect of the invention and provide black-start service according to the new and inventive approach according to which groups of wind turbine generators 3, 4 may started simultaneously using the common energy storage 16, rather than in sequence starting with a single wind turbine generator 3, 4, which has itself first to be stabilized in island mode before it can be used to start other wind turbine generators 3, 4.

In that case, the various parts of infrastructure of the wind farm 1, including transformers 10, HV bus bar system 11, MV bus bar system 9, array cable lines 5, 6 etc. as well as the export cable 12 are isolated from each other by means of conventional switchgear not shown.

Utilizing now the large energy storage capacity of the energy storage 16, it is possible to energize the infrastructure of islanded wind farm 1 in a novel step by step process according to the invention.

So the converter will first energize the transformer 18 and the bus bar system 13. In this respect it should be noted that the amount of energy needed to energize transformers of the size and capacities of a system as the one described here are far from negligible. Likewise, is the energy needed to energize the AC export cable 12 which may have a substantial length and even in some cases exceeding 100 km to an offshore wind farm 1. However, if the energy farm is not offshore, as wind farms sometimes are, or in a location remotely from densely populated areas, as would photovoltaic farms often be, the AC export cable need not be a long AC export cable 12.

Further energy is then needed to energize at least one of the transformers 10 between the HV bus bar system 11 and the MV bus bar system 9, and finally at least one of the array cable lines 5, 6 with the transformers 7, 8 and/or converters associated with the individual wind turbine generators 3, 4 of the group connected to a respective array cable line 5, 6.

Once energized this energized system may be kept stable by the energy storage 16 and converter 17, be it with the assistance of the STATCOM 21 for stabilizing the voltage or balancing the reactive power of the islanded system, or possibly without it, and the entire group of wind turbine generators 3, 4 or parts thereof may be reconnected to the islanded system. Depending on the storage capacity of the energy storage 16, more array cable lines 5, 6 and more transformers 10 could be energized simultaneously. In any case energizing and connecting just one group of wind turbine generators 3, 4 simultaneously on a single array cable line 5, 6 is substantially faster than the traditional approach of starting first a single wind turbine generator 3, 4 and only then increasing the power of the islanded system by adding more wind turbine generators to the island infrastructure of the wind farm 1.

Maintaining a stable island mode of a wind farm 1 is quite a complex task involving control of the power delivered by the wind turbine generators 3, 4, e.g. keeping the wind turbine generators 3, 4 below full production and possibly dissipating excess energy production in one or more dump loads 20, in order to keep frequency and voltage stable.

Once a stable island mode of the wind farm 1 or at least a sufficiently larger part thereof has been achieved the wind farm 1 may be reconnected to the powerless electrical grid 2 using the switchgear 25. The reconnection need not be immediate. Rather, with the energy storage 16 and converter 17, dump loads 20, STATCOM 21, etc., the islanded system may be controlled and kept stable for a desired duration, or in principle any length of time. It should be noted that in the event where a black-start is needed after a total blackout the electrical grid 2 will normally have been divided into smaller sections, so that only the section adjacent the wind farm 1 providing the black-start is energized in by the wind farm 1. Only subsequently will other parts of the electrical grid 2 be energized to e.g. start other wind farms not having black-start capabilities and eventually reach normal operation with energy to all consumers.

However, even if at first only a small section of the powerless electrical grid 2 has to be energized this may provide difficulties, e.g. because of the high initial power demand of the powerless electrical grid 2.

Typically, the wind farm 1 will have limited capability of delivering more than nominal current, say in the range of 1.1 to 1.2 times nominal fault current. However, for clearing faults power of 7 times nominal fault current may be required. If the power is too low, protective relay systems may not be able to trigger and clear faults, such as persisting faults from before the electrical grid went dead. If the loads on the electrical grid 2 are loads with large in-rush currents, such as electric motors, the momentary initial power demand may also destabilize the wind farm 1, which is essentially still in island mode, and force disconnection thereof from the electrical grid 2 again.

This initial power demand is transient and with a very short rise time, so short that the control circuitry of the converter 17 associated with the energy storage 16 may not be able to respond quickly enough. The same would apply to the above-mentioned converters associated with the individual wind turbine generators 3, 4 of the group connected to a respective array cable line 5, 6.

To provide for this transient initial power demand, a synchronous condenser 24 is provided along with the energy storage 16. It may, as can be seen in FIG. 1 be connected to the same bus bar 13 as the energy storage 16 with the converter 17 and the STATCOM 21, as the case may be. Like the energy storage 16 with the converter 17 and the STATCOM 21 the connection from the synchronous condenser 24 to the bus bar 13 may be via a transformer 23. A synchronous condenser 24 is basically a DC magnetized synchronous motor with no load applied to the output shaft. The energy with which the synchronous condenser 24 is energized, is thus stored as rotational energy, immediately available upon demand without any control circuitry or the like being necessary.

As can be seen from FIG. 1 the synchronous condenser 24 is arranged remote from the wind turbine generators 4, i.e.

at the opposite end of the export cable 12 as seen from the wind turbine generators 4, e.g. at the same onshore site as the energy storage 16, the converter 17 and the STATCOM 21. That is to say, the switchgear 25, the synchronous condenser 24, energy storage 16, the converter 17 and the STATCOM 21 are arranged at a first location, typically onshore, remote from a second location, typically offshore, where the wind turbine generators 3,4, array cables, 5,6, transformers 10 and bus bar systems 9, 11. The export cable 12 thus extends between the first and second locations at opposite ends of the export cables 12.

The synchronous condenser 24 is energized as the wind farm 1 reaches stable island mode, so as to be available upon reconnection to the powerless electrical grid 2.

If other corresponding or identical wind farms with black-start capability exist and are located at other parts of the electrical grid 2 it may be possible to provide signals between them on suitable channels 19 so as to already synchronize the black-start wind farms with each other while in island mode in turn leading to a faster re-synchronisation and reconnection of the various parts of the electrical grid 2, when re-establishing the grid 2 after a blackout. The same would be possible with solar farms with black-start capabilities.

When reconnecting the electrical grid 2 using the transformers 15 the converter may remain active for inter alia increased stability. In terms of stability is should be noted that the converter may have an associated or integrated STATCOM 21 allowing the production or absorption of reactive power, in addition to the production or absorption of reactive power by the synchronous condenser 24. This as such will however not complicate the equipment needed and the involved costs in any prohibitive manner, as normally STATCOMs 21 with a corresponding power rating would already need to be implemented in the on-shore substation in order to comply with the grid code requirements regarding production and absorption of reactive power.

Furthermore, the control systems of the converter and the control systems of other controllable components such as transformers with tap-changers, switchable reactors, reactors with tap-changers and STATCOMs 21 may be used individually or in coordination to facilitate energization of the wind farm for example by energizing at lower than normal voltage and subsequently ramping up the voltage thereby limiting transient events during energization. Wind farm control systems, wind turbine control systems, and once reconnected also wind turbines, may be included in controlling the islanded system.

The skilled person will understand that the present invention is not limited to specific types of energy farms, such as wind turbines or wind farm infrastructures. It is applicable in numerous cases where the overall power source comprises multiple individual electrical generators or supplies connected in arrays via DC/AC conversion steps and AC/AC transformations steps collecting and aggregating the generated power a s grid connection point, e.g. in a similar way as described for the wind farms above. In particular photo voltaic solar farms in for example spacious and sunny places remote from populated areas, e.g. in deserts could be envisaged as long as the farms utilize an AC export line for the connection to the electrical grid 2. However, apart from the above-mentioned wind turbines and solar panels the general idea is relevant for any type or mix of types of distributed generation or storage including wave power, hydroelectric power, and thermal power, as well distributed battery storages, such as pools of batteries in electric vehicles set up with a central grid connection point.

The invention claimed is:

1. A method for black-starting a powerless electrical grid by an energy farm, the method comprising:
    disconnecting the energy farm from the electrical grid using a switchgear, wherein the electrical grid is on a first side of the switchgear and an energy storage and an associated converter, electrical infrastructure of the energy farm, and a synchronous condenser are provided on a second side of the switchgear;
    using the energy storage and the associated converter, energizing at least one part of the electrical infrastructure of the energy farm after the energy farm shuts down in response to power loss at the electrical grid, thereby reestablishing energy production at the energy farm;
    using energy produced at the energy farm to energize the synchronous condenser; and then
    reconnecting the energy farm to the electrical grid, thereby supplying energy to the electrical grid by the energy storage and the associated converter, the electrical infrastructure of the energy farm, and the synchronous condenser.

2. The method of claim 1, wherein the electrical infrastructure of the energy farm is operationally dependent on an external AC supply, the energy storage and the associated converter providing the external AC energy while the electrical grid is powerless and/or disconnected.

3. The method of claim 1, wherein the energy farm and the electrical grid are connected via an AC export cable.

4. The method of claim 1, further comprising energizing the AC export cable using the energy storage and the associated converter.

5. The method of claim 1, further comprising operating the energy farm in an island mode before reconnecting the energy farm to the electrical grid.

6. The method of claim 5, further comprising directing excess energy produced by the energy farm to a dump load.

7. The method of claim 5, further comprising stabilizing the voltage or balancing the reactive power of the energy produced by the energy farm using a STATCOM.

8. The method of claim 5, further comprising directing excess energy produced by the energy farm to a dump load and stabilizing the voltage or balancing the reactive power of the energy produced by the energy farm using a STATCOM.

9. The method of claim 1, wherein the energy farm is offshore and the energy storage with the associated converter and the synchronous condenser are on-shore.

10. The method of claim 9, wherein the energy farm is a wind farm.

11. The method of claim 10, wherein the electrical infrastructure of the energy farm comprises a plurality of wind turbine generators which are operationally dependent on an external AC supply.

12. The method of claim 1, wherein the electrical infrastructure of the energy farm comprises two or more groups of electric generators connectable to a corresponding number of array cable lines connectable to a common bus bar system, wherein the at least one part of the energy farm electrical infrastructure energized using said energy storage and the associated converter is energized via one of the array cable lines.

13. The method of claim 1, further comprising sending synchronization information to another energy farm.

14. The method of claim 1, further comprising shutting down the energy farm after the electrical grid loses power and before disconnecting the energy farm from the electrical grid.

15. A system for black-starting a powerless electrical grid by an energy farm, comprising:
a switchgear for disconnecting the energy farm from the electrical grid;
an energy storage and an associated converter for energizing at least one part of an electrical infrastructure of an energy farm after the energy farm shuts down in response to power loss at the electrical grid, thereby reestablishing energy production at the energy farm; and
a synchronous condenser energized using energy produced at the energy farm;
wherein the electrical grid is on a first side of the switchgear and the energy storage, the associated converter, the electrical infrastructure of the energy farm, and the synchronous condenser are all on a second side of a switchgear; and
wherein, after reconnecting the energy farm to the electrical grid, the energy storage and the associated converter, the electrical infrastructure of the energy farm, and the synchronous condenser are all supply energy to the electrical grid.

16. The system of claim 15, wherein the energy farm is operated in an island mode before reconnecting the energy farm to the electrical grid.

17. The system of claim 15, further comprising a dump load for receiving excess energy produced by the energy farm and a STATCOM for stabilizing the voltage or balancing the reactive power of the energy produced by the energy farm.

* * * * *